(12) United States Patent
Wu et al.

(10) Patent No.: US 12,256,411 B2
(45) Date of Patent: Mar. 18, 2025

(54) HARQ-ACK CODEBOOK FEEDBACK METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Zuomin Wu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 357 days.

(21) Appl. No.: 17/865,853

(22) Filed: Jul. 15, 2022

(65) Prior Publication Data

US 2022/0353853 A1   Nov. 3, 2022

Related U.S. Application Data

(63) Continuation of application No. PCT/CN2020/073980, filed on Jan. 23, 2020.

(51) Int. Cl.
  *H04W 72/23* (2023.01)
  *H04L 1/1829* (2023.01)

(52) U.S. Cl.
  CPC .......... *H04W 72/23* (2023.01); *H04L 1/1854* (2013.01); *H04L 1/1861* (2013.01)

(58) Field of Classification Search
  None
  See application file for complete search history.

(56) References Cited

U.S. PATENT DOCUMENTS 12,082,238 B2 *   9/2024   Jung .................... H04W 72/21
2016/0205690 A1   7/2016   Berggren et al.
(Continued)

FOREIGN PATENT DOCUMENTS

CN    110535571 A    12/2019
CN    110603767 A    12/2019
(Continued)

OTHER PUBLICATIONS

International Search Report and Written Opinion dated Oct. 27, 2020 in International Application No. PCT/CN2020/073980. English translation attached.
(Continued)

*Primary Examiner* — Kodzovi Acolatse
(74) *Attorney, Agent, or Firm* — Sheppard, Mullin, Richter & Hampton LLP

(57) ABSTRACT

The present disclosure relates to communication technology, and provides a HARQ-ACK codebook feedback method and apparatus, a device, and a storage medium. The method includes: determining a target feedback sequence. The target feedback sequence includes at least one of a first feedback sequence and a second feedback sequence, the first feedback sequence includes feedback information sorted based on HARQ process numbers on N carriers, and the second feedback sequence includes feedback information on at least one of the N carriers, where N is a positive integer. The method further includes: transmitting the target feedback sequence over a target time unit. The target feedback sequence may include the feedback information sorted based on HARQ process numbers, and the second feedback sequence corresponding to other cases. In this way, the flexibility of HARQ-ACK codebook feedback can be improved.

19 Claims, 6 Drawing Sheets

(56) References Cited

U.S. PATENT DOCUMENTS

| | | | |
|---|---|---|---|
| 2020/0106566 A1* | 4/2020 | Yeo | H04L 1/1854 |
| 2020/0314815 A1* | 10/2020 | Kim | H04L 1/1671 |
| 2022/0166555 A1* | 5/2022 | Takeda | H04L 1/188 |
| 2022/0174666 A1* | 6/2022 | Kou | H04L 5/0012 |
| 2022/0303064 A1* | 9/2022 | Yang | H04W 72/23 |
| 2022/0303100 A1* | 9/2022 | Yang | H04L 1/1861 |
| 2022/0303979 A1* | 9/2022 | Li | H04W 72/0446 |
| 2022/0338226 A1* | 10/2022 | Nemeth | H04L 5/001 |

FOREIGN PATENT DOCUMENTS

| | | | |
|---|---|---|---|
| WO | 2014134957 A1 | 9/2014 | |
| WO | 2019027308 A1 | 2/2019 | |

OTHER PUBLICATIONS

NTT Docomo, Inc."UL control signalling for CBG-based (re)transmission" 3GPP TSG RAN WG1 NR Ad-Hoc#2, RI-1711114, Jun. 30, 2017(Jun. 30, 2017), entire document.

Huawei et al. "Discussion on CBG-Based Feedback" 3GPP TSG RAN WGJ Meeting #90, RI-1712202,Aug. 25, 2017 (Aug. 25, 2017), entire document.

Extended European Search Report dated Nov. 8, 2022 received in European Patent Application No. EP20915183.6.

* cited by examiner

| NACK | NACK | NACK | NACK | NACK | NACK | NACK | NACK |
|------|------|------|------|------|------|------|------|
| HARQ0 | HARQ0 | HARQ0 | HARQ0 | HARQ1 | HARQ1 | HARQ1 | HARQ1 |
| NACK | NACK | NACK | NACK | NACK | NACK | NACK | NACK |
| HARQ2 | HARQ2 | HARQ2 | HARQ2 | HARQ3 | HARQ3 | HARQ3 | HARQ3 |
| CBG0 decoding result | CBG1 decoding result | CBG2 decoding result | CBG3 decoding result | NACK | NACK | NACK | NACK |
| HARQ4 | HARQ4 | HARQ4 | HARQ4 | HARQ5 | HARQ5 | HARQ5 | HARQ5 |
| NACK | NACK | NACK | NACK | NACK | NACK | NACK | NACK |
| HARQ6 | HARQ6 | HARQ6 | HARQ6 | HARQ7 | HARQ7 | HARQ7 | HARQ7 |
| CBG0 decoding result | CBG1 decoding result | NACK | NACK | NACK | NACK | NACK | NACK |
| HARQ8 | HARQ8 | HARQ8 | HARQ8 | HARQ9 | HARQ9 | HARQ9 | HARQ9 |
| NACK | NACK | NACK | NACK | NACK | NACK | NACK | NACK |
| HARQ10 | HARQ10 | HARQ10 | HARQ10 | HARQ11 | HARQ11 | HARQ11 | HARQ11 |
| NACK | NACK | NACK | NACK | NACK | NACK | NACK | NACK |
| HARQ12 | HARQ12 | HARQ12 | HARQ12 | HARQ13 | HARQ13 | HARQ13 | HARQ13 |
| NACK | NACK | NACK | NACK | NACK | NACK | NACK | NACK |
| HARQ14 | HARQ14 | HARQ14 | HARQ14 | HARQ15 | HARQ15 | HARQ15 | HARQ15 |
| NACK | TB decoding result | NACK | NACK | NACK | NACK | NACK | NACK |
| HARQ0 | HARQ1 | HARQ2 | HARQ3 | HARQ4 | HARQ5 | HARQ6 | HARQ7 |
| NACK | TB decoding result | NACK | NACK | NACK | NACK | NACK | NACK |
| HARQ8 | HARQ9 | HARQ10 | HARQ11 | HARQ12 | HARQ13 | HARQ14 | HARQ15 |

Feedback information for first DC1

SPS
PDSCH
release

FIG. 4

| NACK | NACK | NACK | NACK | NDI=0 | NACK | NACK | NACK | NACK | NACK |
|---|---|---|---|---|---|---|---|---|---|
| HARQ0 | HARQ0 | HARQ0 | HARQ0 | HARQ0 | HARQ1 | HARQ1 | HARQ1 | HARQ1 | HARQ1 |
| NACK | NACK | NACK | NACK | NDI=0 | NACK | NACK | NACK | NACK | NACK |
| HARQ2 | HARQ2 | HARQ2 | HARQ2 | HARQ2 | HARQ3 | HARQ3 | HARQ3 | HARQ3 | HARQ3 |
| CBG0 decoding result | CBG1 decoding result | CBG2 decoding result | CBG3 decoding result | NDI=1 | NACK | NACK | NACK | NACK | NACK |
| HARQ4 | HARQ4 | HARQ4 | HARQ4 | HARQ4 | HARQ5 | HARQ5 | HARQ5 | HARQ5 | HARQ5 |
| NACK | NACK | NACK | NACK | NDI=0 | NACK | NACK | NACK | NACK | NACK |
| HARQ6 | HARQ6 | HARQ6 | HARQ6 | HARQ6 | HARQ7 | HARQ7 | HARQ7 | HARQ7 | HARQ7 |
| CBG0 decoding result | CBG1 decoding result | NACK | NACK | NDI=0 | NACK | NACK | NACK | NACK | NACK |
| HARQ8 | HARQ8 | HARQ8 | HARQ8 | HARQ8 | HARQ9 | HARQ9 | HARQ9 | HARQ9 | HARQ9 |
| NACK | NACK | NACK | NACK | NDI=0 | NACK | NACK | NACK | NACK | NACK |
| HARQ10 | HARQ10 | HARQ10 | HARQ10 | HARQ10 | HARQ11 | HARQ11 | HARQ11 | HARQ11 | HARQ11 |
| NACK | NACK | NACK | NACK | NDI=0 | NACK | NACK | NACK | NACK | NACK |
| HARQ12 | HARQ12 | HARQ12 | HARQ12 | HARQ12 | HARQ13 | HARQ13 | HARQ13 | HARQ13 | HARQ13 |
| NACK | NACK | NACK | NACK | NDI=0 | NACK | NACK | NACK | NACK | NACK |
| HARQ14 | HARQ14 | HARQ14 | HARQ14 | HARQ14 | HARQ15 | HARQ15 | HARQ15 | HARQ15 | HARQ15 |
| NACK | NDI=0 | TB decoding result | NDI of predetermined value | NACK | NDI=0 | NACK | NDI=0 | NACK | NDI=0 |
| HARQ0 | HARQ0 | HARQ1 | HARQ1 | HARQ2 | HARQ2 | HARQ3 | HARQ3 | HARQ4 | HARQ4 |
| NACK | NDI=0 | NACK | NDI=0 | NACK | NDI=0 | NACK | NDI=0 | TB decoding result | NDI=1 |
| HARQ5 | HARQ5 | HARQ6 | HARQ6 | HARQ7 | HARQ7 | HARQ8 | HARQ8 | HARQ9 | HARQ9 |
| NACK | NDI=0 | NACK | NDI=0 | NACK | NDI=0 | NACK | NDI=0 | NACK | NDI=0 |
| HARQ10 | HARQ10 | HARQ11 | HARQ11 | HARQ12 | HARQ12 | HARQ13 | HARQ13 | HARQ14 | HARQ14 |
| NACK | NDI=0 | Feedback information for first DCI | | | | | | | |
| HARQ15 | HARQ15 | SPS PDSCH release | | | | | | | |

FIG. 5

| NACK | NACK | NACK | NACK | NACK | NACK | NACK | NACK |
|---|---|---|---|---|---|---|---|
| HARQ0 | HARQ0 | HARQ0 | HARQ0 | HARQ1 | HARQ1 | HARQ1 | HARQ1 |
| NACK | NACK | NACK | NACK | NACK | NACK | NACK | NACK |
| HARQ2 | HARQ2 | HARQ2 | HARQ2 | HARQ3 | HARQ3 | HARQ3 | HARQ3 |
| CBG0 decoding result | CBG1 decoding result | CBG2 decoding result | CBG3 decoding result | NACK | NACK | NACK | NACK |
| HARQ4 | HARQ4 | HARQ4 | HARQ4 | HARQ5 | HARQ5 | HARQ5 | HARQ5 |
| NACK | NACK | NACK | NACK | NACK | NACK | NACK | NACK |
| HARQ6 | HARQ6 | HARQ6 | HARQ6 | HARQ7 | HARQ7 | HARQ7 | HARQ7 |
| CBG0 decoding result | CBG1 decoding result | NACK | NACK | NACK | NACK | NACK | NACK |
| HARQ8 | HARQ8 | HARQ8 | HARQ8 | HARQ9 | HARQ9 | HARQ9 | HARQ9 |
| NACK | NACK | NACK | NACK | NACK | NACK | NACK | NACK |
| HARQ10 | HARQ10 | HARQ10 | HARQ10 | HARQ11 | HARQ11 | HARQ11 | HARQ11 |
| NACK | NACK | NACK | NACK | NACK | NACK | NACK | NACK |
| HARQ12 | HARQ12 | HARQ12 | HARQ12 | HARQ13 | HARQ13 | HARQ13 | HARQ13 |
| NACK | NACK | NACK | NACK | NACK | NACK | NACK | NACK |
| HARQ14 | HARQ14 | HARQ14 | HARQ14 | HARQ15 | HARQ15 | HARQ15 | HARQ15 |
| Feedback information for first DCI | NACK | TB decoding result | NACK | NACK | NACK | NACK | NACK |
| SPS PDSCH release | HARQ0 | HARQ1 | HARQ2 | HARQ3 | HARQ4 | HARQ5 | HARQ6 |
| NACK | NACK | TB decoding result | NACK | NACK | NACK | NACK | NACK |
| HARQ7 | HARQ8 | HARQ9 | HARQ10 | HARQ11 | HARQ12 | HARQ13 | HARQ14 |
| NACK | | | | | | | |
| HARQ15 | | | | | | | |

FIG. 6

| NACK | NACK | NACK | NACK | NDI=0 | NACK | NACK | NACK | NACK | NACK |
|---|---|---|---|---|---|---|---|---|---|
| HARQ0 | HARQ0 | HARQ0 | HARQ0 | HARQ0 | HARQ1 | HARQ1 | HARQ1 | HARQ1 | HARQ1 |
| NACK | NACK | NACK | NACK | NDI=0 | NACK | NACK | NACK | NACK | NACK |
| HARQ2 | HARQ2 | HARQ2 | HARQ2 | HARQ2 | HARQ3 | HARQ3 | HARQ3 | HARQ3 | HARQ3 |
| CBG0 decoding result | CBG1 decoding result | CBG2 decoding result | CBG3 decoding result | NDI=1 | NACK | NACK | NACK | NACK | NACK |
| HARQ4 | HARQ4 | HARQ4 | HARQ4 | HARQ4 | HARQ5 | HARQ5 | HARQ5 | HARQ5 | HARQ5 |
| NACK | NACK | NACK | NACK | NDI=0 | NACK | NACK | NACK | NACK | NACK |
| HARQ6 | HARQ6 | HARQ6 | HARQ6 | HARQ6 | HARQ7 | HARQ7 | HARQ7 | HARQ7 | HARQ7 |
| CBG0 decoding result | CBG1 decoding result | NACK | NACK | NDI=0 | NACK | NACK | NACK | NACK | NACK |
| HARQ8 | HARQ8 | HARQ8 | HARQ8 | HARQ8 | HARQ9 | HARQ9 | HARQ9 | HARQ9 | HARQ9 |
| NACK | NACK | NACK | NACK | NDI=0 | NACK | NACK | NACK | NACK | NACK |
| HARQ10 | HARQ10 | HARQ10 | HARQ10 | HARQ10 | HARQ11 | HARQ11 | HARQ11 | HARQ11 | HARQ11 |
| NACK | NACK | NACK | NACK | NDI=0 | NACK | NACK | NACK | NACK | NACK |
| HARQ12 | HARQ12 | HARQ12 | HARQ12 | HARQ12 | HARQ13 | HARQ13 | HARQ13 | HARQ13 | HARQ13 |
| NACK | NACK | NACK | NACK | NDI=0 | NACK | NACK | NACK | NACK | NACK |
| HARQ14 | HARQ14 | HARQ14 | HARQ14 | HARQ14 | HARQ15 | HARQ15 | HARQ15 | HARQ15 | HARQ15 |
| Feedback information for first DCI SPS PDSCH release | NACK | NDI=0 | TB decoding result | NDI of predetermined value | NACK | NDI=0 | NACK | NDI=0 | NACK |
| | HARQ0 | HARQ0 | HARQ1 | HARQ1 | HARQ2 | HARQ2 | HARQ3 | HARQ3 | HARQ4 |
| NDI=0 | NACK | NDI=0 | NACK | NDI=0 | NACK | NDI=0 | NACK | NDI=0 | TB decoding result |
| HARQ4 | HARQ5 | HARQ5 | HARQ6 | HARQ6 | HARQ7 | HARQ7 | HARQ8 | HARQ8 | HARQ9 |
| NDI=1 | NACK | NDI=0 | NACK | NDI=0 | NACK | NDI=0 | NACK | NADI=0 | NACK |
| HARQ9 | HARQ10 | HARQ10 | HARQ11 | HARQ11 | HARQ12 | HARQ12 | HARQ13 | HARQ13 | HARQ14 |
| NDI=0 | NACK | NDI=0 | | | | | | | |
| HARQ14 | HARQ15 | HARQ15 | | | | | | | |

FIG. 7

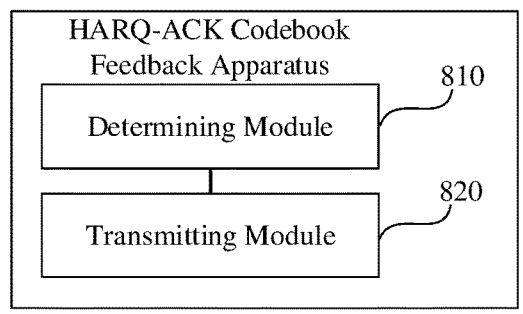

FIG. 8

HARQ-ACK CODEBOOK FEEDBACK METHOD AND APPARATUS, DEVICE, AND STORAGE MEDIUM

CROSS-REFERENCE TO RELATED APPLICATIONS

The present application is a continuation of International Application No. PCT/CN2020/073980 filed on Jan. 23, 2020, which is hereby incorporated by reference in its entirety.

TECHNICAL FIELD

The present disclosure relates to communication technology, and more particularly, to a HARQ-ACK codebook feedback method and apparatus, a device, and a storage medium.

BACKGROUND

A Hybrid Automatic Repeat Request Acknowledgement (HARQ-ACK) codebook feedback method, known as Type-3 HARQ-ACK codebook feedback, or referred to as one-shot HARQ-ACK codebook feedback, is introduced in the New Radio-based Access To Unlicensed Spectrum (NR-U) system. A network device can configure one-shot HARQ-ACK codebook feedback for the terminal device, and trigger the terminal device to operate accordingly via Downlink Control Information (DCI). The one-shot HARQ-ACK codebook feedback includes feedback information corresponding to all HARQ processes on carriers configured in one Physical Uplink Control Channel (PUCCH) group. Currently, the one-shot HARQ-ACK codebook feedback has become a research hotspot.

SUMMARY

The embodiments of the present disclosure provide a HARQ-ACK codebook feedback method and apparatus, a device, and a storage medium, capable of solving the problem regarding how to determine a one-shot HARQ-ACK codebook. The following solutions are provided.

In an aspect, a HARQ-ACK codebook feedback method is provided. The method includes: determining a target feedback sequence. The target feedback sequence includes at least one of a first feedback sequence and a second feedback sequence, the first feedback sequence includes feedback information sorted based on HARQ process numbers on N carriers, and the second feedback sequence includes feedback information on at least one of the N carriers, where N is a positive integer. The method further includes: transmitting the target feedback sequence over a target time unit.

In another aspect, a HARQ-ACK codebook feedback apparatus is provided. The apparatus includes: a determining module configured to determine a target feedback sequence. The target feedback sequence includes at least one of a first feedback sequence and a second feedback sequence, the first feedback sequence includes feedback information sorted based on HARQ process numbers on N carriers, and the second feedback sequence includes feedback information on at least one of the N carriers, where N is a positive integer. The apparatus further includes: a transmitting module configured to transmit the target feedback sequence over a target time unit.

In yet another aspect, a device is provided. The device includes a processor and a memory. The memory has at least one instruction stored thereon. The at least one instruction, when executed by the processor, implements the method according to the aspect.

In still another aspect, a computer-readable storage medium is provided. The computer-readable storage medium has at least one instruction stored thereon. The at least one instruction, when executed by a processor, implements the method according to the aspect.

In still yet another aspect, a computer program product is provided. The computer program product includes one or more computer programs which, when executed by a processor, implement the method according to the aspect.

The solutions according to the embodiments of the present disclosure have at least the following advantageous effects.

A target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers. That is, the target feedback sequence may include the feedback information sorted based on HARQ process numbers, and the second feedback sequence corresponding to other cases. In this way, the flexibility of HARQ-ACK codebook feedback can be improved.

BRIEF DESCRIPTION OF DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

FIG. 4 is a schematic diagram showing a HARQ-ACK codebook according to an exemplary embodiment of the present disclosure;

FIG. 5 is a schematic diagram showing a HARQ-ACK codebook according to another exemplary embodiment of the present disclosure;

FIG. 6 is a schematic diagram showing a HARQ-ACK codebook according to yet another exemplary embodiment of the present disclosure;

FIG. 7 is a schematic diagram showing a HARQ-ACK codebook according to still another exemplary embodiment of the present disclosure;

FIG. 8 is a schematic diagram showing a structure of a HARQ-ACK codebook feedback apparatus according to an exemplary embodiment of the present disclosure;

DESCRIPTION OF EMBODIMENTS

Figure 1:
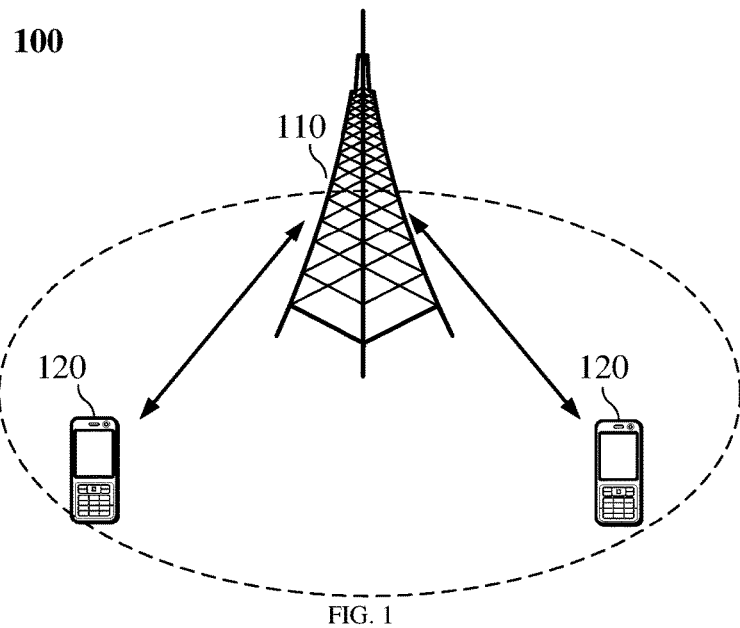
FIG. 1 is a schematic diagram showing an implementation environment according to an exemplary embodiment of the present disclosure.

The embodiments of the present disclosure will be further described in detail below with reference to the accompanying drawings, such that the objects, technical solutions, and advantages of the present disclosure will become more apparent.

Before introducing the HARQ-ACK codebook feedback method according to the embodiments of the present disclosure, some related content, application scenarios, and implementation environments involved in the embodiments of the present disclosure will be introduced briefly.

First, some related content involved in the embodiments of the present disclosure will be introduced briefly.

HARQ: This mechanism can use a Stop-and-Wait Protocol (also known as SQW protocol) to transmit data. In the Stop-and-Wait protocol, after the transmitter uses a HARQ process to transmit a Transmission Block (TB), it stops and waits for feedback information. This procedure may also be referred to as a HARQ procedure. In this way, the transmitter will stop and wait for acknowledgement after transmitting the TB. However, the above scheme may easily lead to low user throughput. Therefore, in order to improve user throughput, multiple parallel HARQ processes can be used for TB transmission. When one HARQ process is waiting for feedback information, the transmitter can use another HARQ process to continue TB transmission. These HARQ processes together form a HARQ entity. Each HARQ entity is responsible for maintaining a set of parallel downlink HARQ processes and a set of parallel uplink HARQ processes. The HARQ entity utilizes the Stop-and-Wait protocol to allow data blocks to be transmitted continuously. In the HARQ process, the feedback information includes Acknowledgment (ACK) information or Negative Acknowledgment (NACK) information. If a successful reception is confirmed, the feedback information is ACK, and if a failed reception is confirmed, the feedback information is NACK. A feedback sequence including ACK information or NACK information may be referred to as a HARQ-ACK codebook.

One-shot HARQ-ACK codebook feedback: For downlink transmission, also known as Type-3 HARQ-ACK codebook feedback, it can be configured by a network device for a terminal device. If the network device configures Type-3 HARQ-ACK codebook feedback for the terminal device, the network device can trigger, via Downlink Control Information (DCI), the terminal device to perform one-shot HARQ-ACK codebook feedback, e.g., indicating valid PUCCH resources for the one-shot HARQ-ACK codebook feedback. The one-shot HARQ-ACK codebook includes feedback information corresponding to all HARQ processes on all configured carriers in one PUCCH group, and the feedback information includes ACK information or NACK information. Here, the feedback information corresponding to a HARQ process including a downlink transmission is a decoding result of the downlink transmission, and the feedback information corresponding to a HARQ process including no downlink transmission is a predetermined value or an initial value.

For uplink transmission, if one-shot HARQ-ACK codebook feedback is configured, the network device can transmit the feedback information corresponding to all HARQ processes on the carrier to the terminal device via DCI. Here, the feedback information corresponding to a HARQ process including an uplink transmission is a decoding result of the uplink transmission, and the feedback information corresponding to a HARQ process including no uplink transmission is a predetermined value or an initial value. The uplink transmission may include an uplink transmission scheduled by DCI and an uplink transmission scheduled by Configured Grant (CG).

Currently, one-shot HARQ-ACK codebook feedback can include two types, one is one-shot HARQ-ACK codebook feedback that carries New Data Indication (NDI) information, and the other is one-shot HARQ-ACK codebook feedback that does not carry NDI information. Here, the NDI information can be used to determine whether the corresponding data is retransmitted data or new data. Generally, when the data is new data, the current NDI information will be inverted with respect to the NDI information transmitted previously. Thus, it can be determined whether the data is new data or retransmitted data based on whether the NDI information is inverted. For example, if the NDI information transmitted previously is "1", and if the current NDI information is "0", it can be determined that the NDI information has been inverted at this time, and accordingly that the current data packet is a new data packet. As an example, the network device may configure, via Radio Resource Control (RRC) signaling, whether the terminal device needs to carry NDI information in the HARQ-ACK codebook feedback.

HARQ codebook: The entirety of feedback information fed back by a terminal device on one HARQ feedback resource is referred to as a HARQ codebook (or HARQ-ACK codebook). In one-shot HARQ-ACK codebook feedback, the HARQ codebook includes feedback information corresponding to all HARQ processes on all carriers in one PUCCH group (or one cell group).

Semi-Persistent Scheduling Physical Downlink Shared Channel (SPS PDSCH): In order to support periodic services with substantially fixed traffic, while reducing overhead due to frequent Physical Downlink Control Channel (PDCCH) scheduling, the NR system can support semi-static resource configuration. The semi-static resource configuration means that the network device configures resources semi-statically for the terminal device via high-layer signaling, e.g., RRC signaling, and when there is a service requirement, the network device uses DCI carried by the PDCCH to activate the semi-static resource configuration for the terminal device, such that the terminal device can receive service data using the configured resource at a fixed period.

In other words, the terminal device can be configured with an SPS configuration resource, and the network device can indicate, by means of activation or deactivation, the terminal device whether to perform SPS PDSCH transmission on the SPS-configured resource. The SPS configuration resource may be configured on an SpCell or on an SCell. In R15, the network device needs to ensure that at most one cell in one cell group is configured with a downlink SPS configuration resource. With the evolution of the release, multiple downlink SPS configuration resources can be configured in one cell group.

A downlink SPS configuration resource is mainly activated and deactivated via DCI scrambled with a Configured Scheduling-Radio Network Temporary Identity (CS-RNTI). As an example, if the terminal device receives the DCI scrambled with the CS-RNTI, and an NDI field corresponding to an enabled TB is set to "0", then the terminal device can determine whether a downlink SPS scheduling activation command or deactivation command (or release command) is received according to Table 1 (special field settings of PDCCH activated by downlink SPS scheduling) and Table 2 (special field settings of PDCCH released by downlink SPS scheduling). If the terminal device receives an SPS PDSCH deactivation DCI, the terminal device is expected to perform corresponding HARQ-ACK feedback after N symbols. The N symbols is counted from the last symbol of the PDCCH corresponding to the SPS PDSCH deactivation DCI. The value of N can be a predetermined value, which can be set depending on requirements.

TABLE 1

|  | DCI format 1_0 | DCI format 1_1 |
|---|---|---|
| HARQ process no. | set to all '0's | set to all '0's |
| Redundancy version | set to '00' | For the enabled transport block: set to '00' |

TABLE 2

|  | DCI format 1_0 |
|---|---|
| HARQ process no. | set to all '0's |
| Redundancy version | set to '00' |
| Modulation and coding scheme | set to all '1's |
| Resource block allocation | set to all '1's |

If the terminal device is configured with and activated for a downlink SPS transmission, the terminal device receives an SPS PDSCH, transmitted by the network device, on a downlink SPS configuration resource. Here, the SPS PDSCH is periodically transmitted on the downlink SPS configuration resource, and the SPS PDSCH has no corresponding PDCCH scheduling.

Since there is no PDCCH scheduling, the SPS PDSCH transmitted on the downlink SPS configuration resource only includes an initial transmission. If the initial transmission of a HARQ process fails and needs to be retransmitted, the network device will schedule the same HARQ process via DCI scrambled with a CS-RNTI, with the NDI field set to "1". In other words, if the terminal device receives the DCI scrambled with the CS-RNTI and the NDI field is set to "1", the terminal device will consider the HARQ process scheduled by the DCI as a retransmission.

Configured Grant Physical Uplink Shared Channel (CG-PUSCH):

In order to support periodic services with substantially fixed traffic, while reducing overhead due to frequent Physical Downlink Control Channel (PDCCH) scheduling, the NR system can support semi-static uplink resource configuration. The semi-static resource configuration means that the network device configures resources semi-statically for the terminal device via high-layer signaling, e.g., RRC signaling. In the NR system, uplink transmission based on Configured Grant without Dynamic Grant scheduling can be performed over CG resources configured semi-statically via high-layer signaling. There are two specific implementation solutions: the actual uplink grant can be obtained via RRC configuration (type 1) or via PDCCH scrambled with CS-RNTI (type 2). When the terminal device has a service requirement, it can transmit service data using the activated (or granted) semi-static resource configuration. Here, the activation and deactivation schemes of Type 2 CG-PUSCH resources are similar to the activation and deactivation schemes of SPS PDSCH resources.

Next, the application scenarios involved in the present disclosure will be briefly introduced.

In the NR system, the network device can configure SPS configuration resources (also referred to as semi-static resources) for the terminal device, and determine, via activation signaling or deactivation signaling, whether to perform SPS PDSCH transmission on the SPS configuration resources. In this way, if the SPS PDSCH transmission is supported, and the terminal device is triggered to perform one-shot HARQ-ACK codebook feedback, how to perform HARQ-ACK information feedback becomes a research hotspot. To this end, an embodiment of the present disclosure provides a HARQ codebook feedback method, and for specific implementation thereof, reference may be made to the following embodiments.

In addition, the implementation environments involved in the embodiments of the present disclosure will be briefly introduced.

The technical solutions of the embodiments of the present disclosure can be applied to various communication systems, including for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-Based Access to Unlicensed Spectrum (LTE-U) system, NR-U system, Universal Mobile Telecommunication System (UMTS), Worldwide Interoperability for Microwave Access (WiMAX) communication system, Wireless Local Area Network (WLAN), Wireless Fidelity (WiFi), next-generation communication system, or any other communication system, etc.

Generally, traditional communication systems support a limited number of connections and are easy to implement. However, with the development of communication technology, mobile communication systems will support not only traditional communication, but also for example Device to Device (D2D) communication, Machine to Machine (M2M) communication, Machine Type Communication (MTC), Vehicle to Vehicle (V2V) communication, and Vehicle To Everything (V2X) system, etc. The embodiments of the present disclosure can also be applied to these communication systems.

The system architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

Exemplarily, the communication system 100 in which the embodiments of the present disclosure can be applied is shown in FIG. 1. The communication system 100 may include a network device 110, which may be a device that communicates with terminal devices 120 (or referred to as communication terminal or terminal). The network device 110 may provide communication coverage for a specific geographic area, and may communicate with terminals located in the coverage area. Optionally, the network device 110 may be a base station such as an evolved base station such as an evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future communication system, etc.

The communication system 100 also includes at least one terminal device 120 located within the coverage area of the network device 110. As used herein, the "terminal" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an AM-FM broadcast transmitter, and/or of another terminal, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user apparatus. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal in a 5G network, or a terminal in a future evolved PLMN, etc.

Optionally, Device to Device (D2D) direct communication may be performed between the terminal devices 120.

Optionally, the 5G communication system or 5G network may also be referred to as a New Radio (NR) system or NR network.

FIG. 1 exemplarily shows one network device and two terminals. Optionally, the communication system 100 may include a plurality of network devices and the coverage of each network device may include a different number of terminals. The embodiments of the present disclosure are not limited to this.

Optionally, the communication system 100 may also include other network entities such as a network controller and a mobility management entity. The embodiments of the present disclosure are not limited to this.

It can be appreciated that any device with a communication function in the network/system in the embodiments of the present disclosure may be referred to as a communication device. Taking the communication system 100 shown in FIG. 1 as an example, the communication devices may include the network device 110 and the terminal devices 120, each having a communication function. The network device 110 and the terminal devices 120 may be the specific devices as described above, and details thereof will be omitted here. The communication device may also include other devices in the communication system 100, such as a network controller, a mobility management entity, and other network entities. The embodiments of the present disclosure are not limited to this.

After introducing the related content, application scenarios, and implementation environments involved in the embodiments of the present disclosure, the HARQ-ACK codebook feedback method according to the embodiments of the present disclosure will be described in detail with reference to the following embodiments taken in conjunction with the accompanying drawings.

Figure 2:
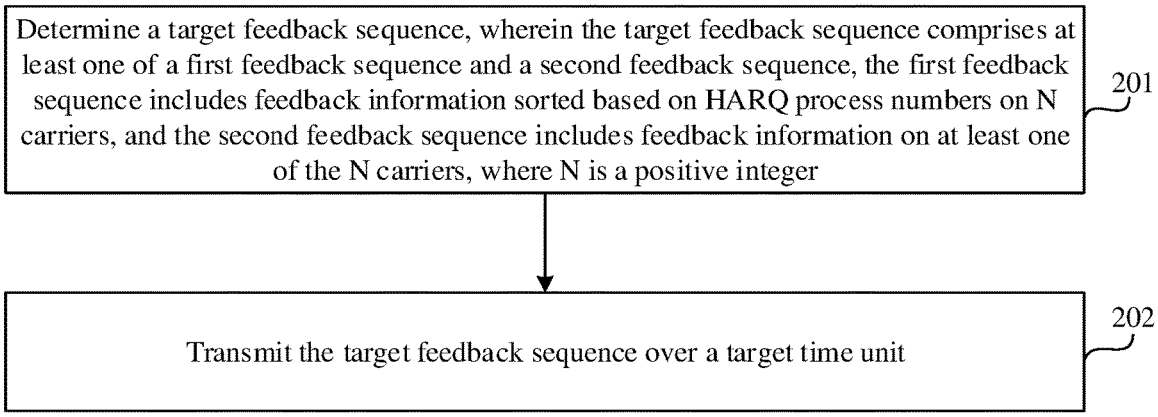
FIG. 2 is a flowchart illustrating a HARQ-ACK codebook feedback method according to an exemplary embodiment of the present disclosure.

FIG. 2 is a flowchart illustrating a HARQ-ACK codebook feedback method according to an exemplary embodiment. The HARQ-ACK codebook feedback method can be applied to the above implementation environment shown in FIG. 1. The method may include at least some of the following content.

At step 201, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers, where N is a positive integer.

That is, the feedback information in the first feedback sequence can be used to determine the corresponding HARQ process number. In other words, if the HARQ process number of the HARQ process on a carrier can be known, the feedback information corresponding to the HARQ process on the carrier can be fed back using the first feedback sequence. For example, the first feedback sequence may include feedback information corresponding to the PDSCH transmission scheduled by the DCI carrying the HARQ process number.

As an example, the first feedback sequence may include feedback information of all HARQ processes on the N carriers, sorted based on the HARQ process numbers. The order of the first feedback sequence is based first on HARQ process numbers and then on carriers. Exemplarily, the feedback information in the first feedback sequence may be sorted in an ascending order of the HARQ process numbers.

For example, assuming that the first feedback sequence includes feedback information sorted based on HARQ process numbers on two carriers: a first carrier including 16 HARQ processes and a second carrier including 8 HARQ processes, in the codebook corresponding to the first feedback sequence, the feedback information is sorted as follows: first the feedback information corresponding to 16 HARQ processes on the first carrier, and then the feedback information corresponding to 8 HARQ processes on the other carrier.

Optionally, the number of HARQ processes included on one carrier may be configured by a network device. Alternatively, if the number of HARQ processes included on one carrier is not configured by the network device, it may be a default value, which may be 8 for example. In addition, in the present disclosure, one carrier may correspond to one cell.

Optionally, the N carriers are all carriers included in one PUCCH group or one cell group. Alternatively, the N carriers are activated carriers among all the carriers included in one PUCCH group or one cell group.

That is, N may be the number of carriers configured by the network device, or may be the number of carriers activated by the network device, and the embodiment of the present disclosure is not limited to any of these examples.

Optionally, the method may be performed by a terminal device, and the operation of determining the target feedback sequence may be for the terminal device to determine the target feedback sequence for a downlink transmission.

Optionally, the method may be performed by a terminal device, and the operation of determining the target feedback sequence may be for the terminal device to determine the target feedback sequence for a sidelink transmission. The sidelink transmission may include a transmission between terminal devices, such as V2X.

Optionally, the method may be performed by a network device, and the operation of determining the target feedback sequence may be for the network device to determine the target feedback sequence for an uplink transmission.

Optionally, if a feedback mode including NDI information is configured by the network device, i.e., the network device indicates that the terminal device needs to feedback NDI information, the first feedback sequence may further include NDI information corresponding to each TB in each HARQ process. Optionally, the maximum number of TBs in each HARQ process can be configured by the network device, e.g., via high-layer signaling. Optionally, the NDI information corresponding to each TB may follow the HARQ-ACK feedback information corresponding to the TB.

Optionally, in the present disclosure, high-layer signaling or high-layer parameter may include RRC information or Media Access Control-Control Element (MAC CE).

Optionally, if a feedback mode including NDI information is configured by the network device, and the first feedback sequence includes second feedback information corresponding to a first HARQ process for transmitting an SPS PDSCH, the second feedback information includes first NDI information, which is a predetermined value.

That is, if the feedback mode including NDI information is configured, it indicates that the terminal device needs to feedback NDI information. If the first feedback sequence includes the second feedback information corresponding to the HARQ process for transmitting the SPS PDSCH, the first NDI information in the second feedback information may be a predetermined value, which may be predetermined depending on actual requirements. This means that if the HARQ process is used for SPS PDSCH transmission, the transmitted data can be considered as new data.

For example, if the first HARQ process is used to transmit the SPS PDSCH on a downlink SPS configuration resource, the value of the first NDI information included in the second feedback information is "0". Alternatively, if the first HARQ process is used to schedule the retransmission of the SPS PDSCH using DCI scrambled with a CS-RNTI, the value of the first NDI information included in the second feedback information is "1".

In another example, the value of the NDI information corresponding to the HARQ process for the initial transmission of the SPS PDSCH is "0", or the value of the NDI information corresponding to the HARQ process for the retransmission of the SPS PDSCH is "1".

Optionally, if a feedback mode including NDI information is configured by the network device, the number of pieces of NDI information included in the first feedback sequence is determined based on the maximum number of TBs configured by the network device for the carrier.

Optionally, the at least one carrier as described above may include a carrier configured with semi-persistent scheduling transmission, or the at least one carrier may include a carrier with semi-persistent scheduling transmission activated. Optionally, the at least one carrier as described above may include a carrier configured with CG resource transmission, or the at least one carrier may include a carrier with CG resource transmission activated.

Optionally, the feedback information included in the second feedback sequence may not be sorted based on the HARQ process numbers. Optionally, the feedback information included in the second feedback sequence may not correspond to any valid HARQ process number. Optionally, the feedback information included in the second feedback sequence may not correspond to any HARQ process number.

For example, in some transmissions, the network device may not indicate the corresponding HARQ process number for the terminal device, or the HARQ process number indicated for the terminal device is not a valid process number, e.g., for indicating other meanings. In this case, if the terminal device also needs to feedback the feedback information corresponding to this type of transmission in the time unit for feeding back the first feedback sequence, the feedback information corresponding to this type of transmission cannot be arranged in an appropriate position in the first feedback sequence. Thus, the terminal device may feedback the feedback information corresponding to this type of transmission using the second feedback sequence.

Optionally, the second feedback sequence may include at least one of the following types of feedback information.

(1) Feedback Information Corresponding to First DCI, the First DCI being DCI Indicating Release of an SPS PDSCH.

For example, the first DCI may be used to deactivate an SPS configuration resource. Currently, the HARQ process number carried in the first DCI can be used to indicate other meanings, i.e., in fact the HARQ process number in the first DCI is invalid. In this case, it is generally impossible to determine the HARQ process number corresponding to the first DCI, resulting in that it may be impossible to arrange the feedback information corresponding to the first DCI in an appropriate position in the first feedback sequence. Therefore, the terminal device can include the feedback information corresponding to the first DCI in the second feedback sequence, such that the feedback information corresponding to the first DCI can be fed back using the second feedback sequence.

Optionally, the first DCI may be DCI on at least one of the N carriers, indicating release of the SPS PDSCH, and/or DCI indicating release of the SPS PDSCH on at least one of the N carriers.

For example, the first DCI may be the DCI on at least one carrier, or the DCI indicating release of the SPS PDSCH on at least one carrier (i.e., the first DCI may not be on the at least one carrier), and this embodiment of the present disclosure is not limited to any of these examples.

It is to be noted that it is only an example as described above that the HARQ process number in the first DCI is currently invalid. In another embodiment, if a first specified field of the first DCI carries the HARQ process number, the feedback information corresponding to the first DCI can be included in the first feedback sequence. For example, if there is an idle first specified field in the first DCI for releasing the SPS PDSCH transmission, and the idle first specified field carries the HARQ process number, then the terminal device may include the feedback information corresponding to the first DCI in the first feedback sequence based on the HARQ process number in the idle first specified field. The embodiment of the present disclosure is not limited to this.

It is also to be noted that it is only an example that the semi-statically configured resource includes an SPS PDSCH. In another embodiment, the semi-statically configured resource may include a CG-PUSCH. In yet another embodiment, the semi-statically configured resource may include an SPS PDSCH and a CG-PUSCH. The same also applies to the following description, and the embodiment of the present disclosure is not limited to any of these examples.

(2) Feedback Information Corresponding to Second DCI, or Feedback Information Corresponding to an SPS PDSCH Scheduled by the Second DCI, the Second DCI being DCI Indicating Activation of the SPS PDSCH.

Currently, no HARQ process number is used in the second DCI indicating activation of the SPS PDSCH, but the SPS PDSCH activated by the second DCI corresponds to a predetermined HARQ process number. For example, the HARQ process number corresponding to the SPS PDSCH may be determined based on the resource for transmission of the SPS PDSCH. Therefore, in an optional implementation, the terminal device may feedback the feedback information corresponding to the second DCI using the second feedback sequence, i.e., the second feedback sequence may include the feedback information corresponding to the second DCI. Alternatively, the terminal device may feedback the feedback information corresponding to the SPS PDSCH scheduled by the second DCI using the second feedback sequence, i.e., the second feedback sequence may include feedback information corresponding to the SPS PDSCH scheduled by the second DCI. In another optional implementation, the terminal device may include, based on the predetermined HARQ process number, the feedback information corresponding to the second DCI in the first feedback sequence, or the terminal device may include, based on the predetermined HARQ process number, the feedback information corresponding to the SPS PDSCH scheduled by the second DCI in the first feedback sequence.

It is to be noted that, if a second specified field in the second DCI carries a HARQ process number, the feedback information corresponding to the second DCI can be included in the first feedback sequence. Alternatively, if a second specified field in the second DCI carries the HARQ process number, the feedback information corresponding to the SPS PDSCH scheduled by the second DCI can be included in the first feedback sequence.

(3) Feedback Information Corresponding to a Physical Channel Scheduled by Third DCI, the Third DCI Including No HARQ Process Number, or the Third DCI Including No Valid HARQ Process Number.

A DCI scheduling scheme is introduced in Ultra Reliable Low Latency Communications (URLLC), in which there may be no indication of any HARQ process number in the DCI. In this case, the second feedback sequence can be used to feed back the feedback information corresponding to the third DCI or the feedback information corresponding to the physical channel scheduled by the third DCI. Exemplarily, the physical channel scheduled by the third DCI may include PDSCH or PUSCH.

In addition, in some scenarios, the third DCI carries a HARQ process number, but the HARQ process number carried in the third DCI indicates other meanings, i.e., the HARQ process number in the third DCI is invalid. In this case, the feedback information corresponding to the third DCI or the feedback information corresponding to the physical channel scheduled by the third DCI may be fed back using the second feedback sequence.

(4) Feedback Information Corresponding to an SPS PDSCH without DCI Scheduling as Transmitted on the at Least One Carrier.

Since there is no DCI scheduling, there is no DCI indicating the HARQ process number corresponding to the SPS PDSCH, and the SPS PDSCH corresponds to a predetermined HARQ process number. For example, the HARQ process number corresponding to the SPS PDSCH may be determined based on the resource for transmission of the SPS PDSCH. Therefore, in an optional implementation, the terminal device may feedback the feedback information corresponding to the SPS PDSCH without DCI scheduling as transmitted on the at least one carrier using the second feedback sequence. In another optional implementation, the terminal device may include, based on the predetermined HARQ process number, the feedback information corresponding to the SPS PDSCH without DCI scheduling in the first feedback sequence.

Optionally, if a feedback mode including NDI information is configured by the network device, the second feedback sequence may further include NDI information, which is a predetermined value. For example, the NDI information may be predetermined to have a value of "0", or the NDI information may be predetermined to have a value of "1". Optionally, the predetermined value of the NDI information may be configured by the network device.

If a feedback mode including NDI information is configured by the network device, the terminal device needs to feedback NDI information during the HARQ-ACK feedback process. Thus, the second feedback sequence may further include NDI information, which may be a predetermined value or may be set depending on actual requirements.

Optionally, if a feedback mode including NDI information is configured by the network device, the number of pieces of NDI information included in the second feedback sequence may be determined based on the maximum number of TBs configured by the network device for the carrier.

Optionally, if a feedback mode including NDI information is configured by the network device, the second feedback sequence may not include NDI information.

For example, if the second feedback sequence includes feedback information corresponding to the DCI for indicating release of the SPS PDSCH, the second feedback sequence may not include NDI information.

In another example, if the second feedback sequence includes feedback information on a carrier configured with a semi-persistently scheduled transmission, e.g., feedback information corresponding to an SPS PDSCH transmitted on an SPS PDSCH resource, the second feedback sequence may not include NDI information. That is, once it is determined to be an SPS PDSCH transmitted on an SPS PDSCH resource, the transmitted data may be considered as new data by default.

Optionally, if at least one of the N carriers has an SPS PDSCH transmission configured thereon, the target feedback sequence may include the first feedback sequence and the second feedback sequence, and the second feedback sequence may include feedback information on the at least one carrier on which the SPS PDSCH transmission is configured. Alternatively, if none of the N carriers has an SPS PDSCH transmission configured thereon, the target feedback sequence may include the first feedback sequence.

As an example, if at least one of the N carriers has an SPS PDSCH transmission configured thereon, the target feedback sequence not only includes the first feedback sequence, but also needs to include the second feedback sequence, so as to use the second feedback sequence to feedback the feedback information on the at least one carrier on which the SPS PDSCH transmission is configured. Of course, if none of the N carriers has an SPS PDSCH transmission configured thereon, for the terminal device, the HARQ process numbers of all HARQ processes on the N carriers can be determined. In this case, the feedback information corresponding to all HARQ processes can be sorted based on the HARQ process numbers. That is, the HARQ-ACK codebook feedback can be provided using the first feedback sequence only, and the target feedback sequence may only include the first feedback sequence.

Optionally, the length of the second feedback sequence may be determined based on the number of SPS PDSCH transmissions configured in the N carriers. For example, assuming that the number of information bits in the feedback information corresponding to one SPS PDSCH transmission configuration is 1 bit, if one SPS PDSCH transmission is configured in the N carriers, it can be determined that the length of the second feedback sequence is 1 bit. In another example, if three SPS PDSCH transmissions are configured in the N carriers, the length of the second feedback sequence is 3 bits.

Optionally, the length of the second feedback sequence may be a predetermined value. For example, the predetermined value may be 1. That is, regardless of the number of SPS PDSCH transmissions configured in the N carriers, the second feedback sequence includes 1 bit, which is used for feedback of release of the one or more SPS PDSCH configurations.

Optionally, if at least one of the N carriers has an SPS PDSCH transmission configured thereon, the length of the target feedback sequence may be determined based on the length of the first feedback sequence and the length of the second feedback sequence. Alternatively, if none of the N carriers has an SPS PDSCH transmission configured thereon, the length of the target feedback sequence may be determined based on the length of the first feedback sequence.

For example, if at least one of the N carriers has J SPS PDSCH transmissions configured thereon, the length of the target feedback sequence needs to be determined based on the length of the first feedback sequence and the length of the second feedback sequence. For example, when the length of the first feedback sequence is L bits, and the length of the second feedback sequence is 1 bit, the length of the target feedback sequence is L+1 bits. For a certain feedback, it is possible that none of the J SPS PDSCH transmissions is activated, i.e., no feedback is need for the J SPS PDSCH transmissions, but the length of the target feedback sequence is still L+1 bits, only at this time the feedback corresponding to the 1 bit is all set as a predetermined value or NACK.

In another example, if none of the N carriers has an SPS PDSCH transmission configured thereon, the length of the target feedback sequence can be determined based on the length of the first feedback sequence. For example, if the length of the first feedback sequence is L bits, then the length of the target feedback sequence is also L bits.

Optionally, the target feedback sequence may further include first indication information. The first indication information is used to determine a total number of information bits included in the first feedback sequence; or the first indication information is used to determine a total number of information bits included in the second feedback sequence; or the first indication information is used to determine a total number of information bits included in both the first feedback sequence and the second feedback sequence.

As an example, the target feedback sequence may further include first indication information. When the target feedback sequence includes the first feedback sequence, the first indication information may be used to determine how many information bits in total are included in the first feedback sequence. Alternatively, when the target feedback sequence includes the second feedback sequence, the first indication information may be used to determine how many information bits in total are included in the second feedback sequence. When the target feedback sequence includes the first feedback sequence and the second feedback sequence, the first indication information may be used to determine how many information bits in total are included in the second feedback sequence, or how many information bits in total are included in the first feedback sequence and the second feedback sequence.

Optionally, the length of the target feedback sequence may be determined based on the length of the first feedback sequence and/or the length of the second feedback sequence.

Since the target feedback sequence may include the first feedback sequence, the second feedback sequence, or both, depending on the actual situation, the length of the target feedback sequence may be determined based on the length of the first feedback sequence and/or the length of the second feedback sequence.

At step 202, the target feedback sequence is transmitted over a target time unit.

Optionally, the operation of transmitting the target feedback sequence over the target time unit may include: transmitting the first feedback sequence, the second feedback sequence, or both over the target time unit.

Accordingly, a receiving device receives the target feedback sequence over the target time unit.

Optionally, a terminal device may determine the target feedback sequence for a downlink transmission, and transmit the target feedback sequence over the target time unit. Accordingly, a network device may receive the target feedback sequence over the target time unit.

Optionally, a first terminal device may determine the target feedback sequence for a sidelink transmission, and transmit the target feedback sequence over the target time unit. Accordingly, a second terminal device may receive the target feedback sequence over the target time unit. The sidelink transmission may include transmission between terminal devices, such as V2X.

Optionally, a network device may determine the target feedback sequence for an uplink transmission, and transmit the target feedback sequence over the target time unit. Accordingly, a terminal device may receive the target feedback sequence over the target time unit. Optionally, the network device may transmit the target feedback sequence over PDCCH or PDSCH, and the terminal device may receive the target feedback sequence over PDCCH or PDSCH.

Optionally, the target feedback sequence may include the first feedback sequence and the second feedback sequence, and the target time unit may include a first uplink resource. In a specific implementation, the operation of transmitting the target feedback sequence over the target time unit may include: transmitting the target feedback sequence over the first uplink resource, with the target feedback sequence including the first feedback sequence and the second feedback sequence, and the first feedback sequence in the target feedback sequence is located before the second feedback sequence. It can be appreciated that, in this case, the first feedback sequence and the second feedback sequence constitute the HARQ-ACK codebook to be fed back.

For example, the first uplink resource may be PUCCH1. That is, if the target feedback sequence includes the first feedback sequence and the second feedback sequence, which are transmitted on the same uplink resource, the first feedback sequence may be located before the second feedback sequence. For example, the target feedback sequence may be in the form of {first feedback sequence, second feedback sequence}.

In another example, the first feedback sequence may also be placed after the second feedback sequence. For example, the target feedback sequence may be {second feedback sequence, first feedback sequence}.

Correspondingly, the network device receives the target feedback sequence over the first uplink resource. For example, the network device receives the target feedback sequence over PUCCH1.

Optionally, the target time unit may be used to feedback the first feedback sequence and the second feedback sequence, and the target time unit may include the first uplink resource. In a specific implementation, the operation of transmitting the target feedback sequence over the target time unit may include: transmitting the target feedback sequence over the first uplink resource, with the target feedback sequence including the first feedback sequence (i.e., the second feedback sequence is not transmitted over the first uplink resource). It can be appreciated that, in this case, the first feedback sequence constitutes the HARQ-ACK codebook to be fed back. That is, when the first feedback sequence and the second feedback sequence are expected to be fed back over the target time unit, it can be considered that the priority of the first feedback sequence is higher than that of the second feedback sequence, such that only the first feedback sequence, not the second feedback sequence, is fed back over the target time unit.

Optionally, if the target feedback information includes the first feedback sequence, the second feedback sequence, and first indication information, and the first indication information is used to determine the total number of information bits included in the second feedback sequence, then the first indication information may be located before the first feedback sequence, or may be located before the second feedback sequence. For example, it may be {first indication information, first feedback sequence, second feedback sequence}, or {first feedback sequence, first indication information, the second feedback sequence}.

Optionally, the target feedback sequence may include the first feedback sequence and the second feedback sequence, the target time unit may include a first uplink resource and a second uplink resource. In a specific implementation, the operation of transmitting the target feedback sequence over the target time unit may include: transmitting the first feedback sequence over the first uplink resource, and/or transmitting the second feedback sequence over the second uplink resource. It can be appreciated that, in this case, the first feedback sequence constitutes the HARQ-ACK codebook to be fed back over the first uplink resource, and the second feedback sequence constitutes the HARQ-ACK codebook to be fed back over the second uplink resource.

For example, the first uplink resource may be PUCCH1, and the second uplink resource may be PUCCH2.

Optionally, at least one of the first uplink resource and the second uplink resource may be a short uplink resource. That is, at least one of the PUCCH1 and PUCCH2 may be a short PUCCH. Optionally, the first uplink resource and the second uplink resource do not overlap in the time domain.

Optionally, if the first uplink resource and the second uplink resource overlap in the time domain, the first feedback sequence and the second feedback sequence may be transmitted according to a certain policy. For example, the first uplink resource may be transmitted with a higher priority, and then the second feedback sequence may be transmitted on the second uplink resource. Alternatively, a target uplink resource can be determined from the first uplink resource and the second uplink resource, and the HARQ-ACK codebook including the first feedback sequence and the second feedback sequence can be fed back over the target uplink resource. The embodiment of the present disclosure is not limited to any of these examples.

It is to be noted that, in an unlicensed scenario, a communication device needs to perform Listen Before Talk (LBT) before transmitting data. If the spectrum is currently occupied, data transmission cannot be performed. Therefore, there may be a case where transmission is not allowed in the unlicensed scenario. Hence, when transmitting the target feedback sequence over the target time unit, there may be a case where the determined target feedback sequence cannot be transmitted over the target time unit, or there may be a case where the feedback sequence can only be transmitted over one uplink resource, i.e., the first feedback sequence over the first uplink resource, or the second feedback sequence over the second uplink resource.

Correspondingly, the network device receives the first feedback sequence over the first uplink resource, and/or receives the second feedback sequence over the second uplink resource.

In the embodiment of the present disclosure, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers. That is, the target feedback sequence may include the feedback information sorted based on HARQ process numbers, or the second feedback sequence corresponding to other cases. In this way, the flexibility of HARQ-ACK codebook feedback can be improved.

Optionally, in an embodiment of the present disclosure, the feedback information may include at least one of: ACK or NACK, NDI, channel state information, Scheduling Request (SR) information, Reference Signal Received Power (RSRP) information, New Feedback Indicator (NFI), etc.

In some embodiments, the HARQ-ACK codebook feedback may include feedback based on TB, feedback based on CBG, or feedback based on TB and CBG. For these cases, the embodiments of the present disclosure also provide the following HARQ-ACK codebook feedback methods.

At step A1, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers, where N is a positive integer.

In general, if a TB includes a plurality of CBGs, and if at least one CBG in the TB is transmitted erroneously in the process of TB-based transmission, the entire TB needs to be retransmitted in the process of retransmitting data using HARQ, which results in a waste of resources. To this end, a CBG-based transmission mode is currently proposed. For example, if at least one CBG in a TB is transmitted erroneously, when retransmitting data using the HARQ process, only the at least one erroneous CBG needs to be retransmitted, and there is no need to retransmit the entire TB. From this, it can be appreciated that in the CB G-based data retransmission, there may be a corresponding CBG-based feedback.

In an implementation, if the terminal device is configured with a CBG-based transmission mode on a certain carrier, when the terminal device performs one-shot HARQ feedback on the carrier, if the terminal device is configured with a CBG-based feedback mode, it needs to perform CBG-based feedback. In this case, the terminal device may not perform TB-based feedback on the carrier, or the terminal device may perform TB-based feedback on the carrier, and the present disclosure is not limited to any of these examples. Alternatively, if the terminal device is not configured with the CBG-based feedback mode, it needs to perform TB-based feedback.

Optionally, in the one-shot HARQ feedback, the network device may configure, via RRC signaling, whether the terminal device is to perform CBG-based feedback when performing the HARQ-ACK codebook feedback.

As an example, in the one-shot HARQ feedback, the network device configuring the CBG-based feedback mode may include: the network device configuring the CBG-based feedback mode for one PUCCH group or one cell group, or the network device independently configuring the CBG-based feedback mode for each carrier.

Optionally, if a CBG-based feedback mode is configured by the network device, and M out of the N carriers are configured with the CBG-based transmission mode, then the feedback information corresponding to each of at least one HARQ process on the M carriers as included in the first feedback sequence has a length determined based on a feedback length of a CBG, and the feedback information corresponding to each of at least one HARQ process on K carriers as included in the first feedback sequence has a length determined based on a feedback length of a TB. The K carriers include other carriers than the M carriers among the N carriers, where M and K are both integers smaller than or equal to N.

As an example, if the CBG-based feedback mode is configured by the network device, and there are M carriers configured with the CBG-based transmission mode, then the feedback information corresponding to each HARQ process in at least one HARQ process on the M carriers may be fed back based on CBG. That is, the length of the feedback information corresponding to each HARQ process in the at least one HARQ process on the M carriers is determined based on the feedback length of the CBG. Specifically, the feedback length of the CBG corresponding to each of the M carriers is determined based on the maximum number of CBGs included in each TB as configured by the network device for the carrier. For example, the parameter maxCodeBlockGroupsPerTransportBlock can be used to indicate the maximum number of CBGs. The feedback lengths of the corresponding CBGs on different carriers among the M carriers may be different or the same, and the present disclosure is not limited to this. The feedback information corresponding to each HARQ process in at least one HARQ process on the other K carriers than the M carriers among the N carriers may be fed back based on TB. That is, the length of the feedback information corresponding to each HARQ process on at least one HARQ process on the K carriers is determined based on the feedback length of the TB. Specifically, the feedback length of the TB corresponding to each of the K carriers is determined based on the maximum number of TBs as configured by the network device for the carrier. For example, the maximum number of TBs can be indicated by the parameter maxNrofCodeWordsScheduledByDCI. The feedback lengths of the corresponding TBs on different carriers among the K carriers may be different or the same, and the present disclosure is not limited to this.

Optionally, in the present disclosure, the feedback length of the CBG corresponding to one carrier may be determined based on the maximum number of CBGs included in each TB as configured by the network device for the carrier. For example, the maximum number of CBGs can be indicated by the parameter maxCodeBlockGroupsPerTransportBlock on the carrier.

Optionally, in the present disclosure, the feedback length of the TB corresponding to one carrier may be determined based on the maximum number of TBs as configured by the network device for the carrier. For example, the maximum number of TBs can be indicated by the parameter maxNrofCodeWordsScheduledByDCI on the carrier. For example, if the maximum number of TBs configured for the carrier is 1, the feedback length of the TB corresponding to the carrier is 1. Alternatively, if the maximum number of TBs configured for the carrier is 2, the feedback length of the TB corresponding to the carrier is 2. Alternatively, if the maximum number of TBs configured for the carrier is 2, and the carrier is configured with space division multiplexing bundling feedback, the feedback length of the TB corresponding to the carrier is 1.

Optionally, in the present disclosure, if feedback including NDI information is configured by the network device, the number of bits in the NDI information corresponding to one HARQ process may be determined based on the maximum number of TBs as configured by the network device for the carrier. In other words, the NDI information for each TB is fed back independently, regardless of whether the space division multiplexing bundling feedback is configured.

Optionally, the first feedback sequence may further include TB-based feedback information corresponding to at least one HARQ process on the M carriers.

Optionally, if none of the N carriers is configured with a CBG-based transmission mode, and/or is configured with a CB G-based feedback mode, the first feedback sequence may include TB-based feedback information corresponding to all HARQ processes on the N carriers. That is, the length of the feedback information corresponding to each of at least one HARQ process on the N carriers as included in the first feedback sequence is determined based on the feedback length of the TB. For example, the feedback length of the TB corresponding to each of the N carriers is determined based on the parameter of the maximum number of TBs as configured by the network device for the carrier.

Optionally, if a CBG-based feedback mode is configured by the network device, and a target carrier among the N carriers is configured with a CBG-based transmission mode, and if scheduling is received on the target carrier, the length of the feedback information corresponding to each of at least one HARQ process on the target carrier as included in the first feedback sequence may be determined based on the feedback length of the CBG; and/or if no scheduling is received on the target carrier, the length of the feedback information corresponding to each of the at least one HARQ process on the target carrier as included in the first feedback sequence may be determined based on the feedback length of the TB.

That is, if there is a target carrier among the N carriers that is configured with a CBG-based transmission mode, it can be determined whether scheduling is received on the target carrier, and if so, the feedback information corresponding to each of at least one HARQ process on the target carrier is fed back based on CBG. Otherwise, even if the CBG-based transmission mode is configured, the feedback information corresponding to at least one HARQ process on the target carrier is still fed back based on TB. That is, in the case where the CBG-based transmission mode is configured, the CBG-based feedback will be performed only if it is scheduled, and the TB-based feedback will be performed if it is not scheduled.

It is to be noted that the above TB-based feedback means that there is one piece of feedback information corresponding to each TB, and the CBG-based feedback means that there is one piece of feedback information for each CBG.

As an example, the scheduling received on the target carrier may include at least one of:

(1) a scheduled PDSCH transmission;
(2) a PDCCH transmission for activating a downlink SPS PDSCH;
(3) a PDCCH transmission for releasing a downlink SPS PDSCH; and
(4) a downlink SPS PDSCH transmission without corresponding PDCCH scheduling.

Optionally, the first feedback sequence may include feedback information of all HARQ processes on the N carriers, sorted based on HARQ process numbers. The order for the first feedback sequence is based on CBG and/or TB, then HARQ process numbers, and then carriers.

For example, if the first feedback sequence includes feedback information corresponding to all HARQ processes on two carriers, with the first carrier including 16 HARQ processes and the second carrier including 8 HARQ processes, then in the codebook corresponding to the first feedback sequence, the CBG and/or TB based feedback information corresponding to each of the 16 HARQ processes in the first carrier is arranged first, and then the CBG and/or TB based feedback information corresponding to each of the 8 HARQ processes in the second carrier is arranged.

It is assumed that the first feedback sequence includes feedback information corresponding to all HARQ processes on two carriers, with Carrier 0 including 16 HARQ processes and being configured with a CBG-based transmission mode, and with Carrier 1 including 8 HARQ processes and not being configured with a CBG-based transmission mode.

As an example, if the CBG-based feedback mode is not configured by the network device, the first feedback sequence may include TB-based feedback information corresponding to all HARQ processes on Carrier 0 and Carrier 1, and the order of the feedback information in the first feedback sequence may include: first the TB-based feedback information corresponding to each of the 16 HARQ processes in Carrier 0, and then the TB-based feedback information corresponding to each of the 8 HARQ processes in Carrier 1.

As an example, if the CBG-based feedback mode is configured by the network device, the first feedback sequence may include feedback information corresponding to all HARQ processes on Carrier 0 and Carrier 1, and the order of the feedback information in the first feedback sequence may include: first the CBG-based feedback information corresponding to each of the 16 HARQ processes in Carrier 0, and then the TB-based feedback information corresponding to each of the 8 HARQ processes in Carrier 1.

As an example, if the CBG-based feedback mode is configured by the network device, the first feedback sequence may include feedback information corresponding to all HARQ processes on Carrier 0 and Carrier 1, and the order of the feedback information in the first feedback sequence may include: first the CBG and TB-based feedback information corresponding to each of the 16 HARQ processes in Carrier 0, and then the TB-based feedback information corresponding to each of the 8 HARQ processes in Carrier 1.

As an example, if the CBG-based feedback mode is configured by the network device, the first feedback sequence may include CBG-based feedback information corresponding to all HARQ processes on Carrier 0 and Carrier 1, and the order of the feedback information in the first feedback sequence may include: first the CBG-based feedback information corresponding to each of the 16 HARQ processes in Carrier 0, and then the CBG-based feedback information corresponding to each of the 8 HARQ processes in Carrier 1.

Optionally, if the CBG-based feedback mode is configured by the network device, and the second feedback sequence includes first feedback information on at least one carrier, then the length of the first feedback information may be determined based on the feedback length of a CBG or the feedback length of a TB, or the length of the first feedback information may be determined based on a predetermined value.

As an example, the feedback length of the CBG may be the number of feedback bits of CBGs corresponding to one TB as configured by a high-layer parameter.

As an example, the feedback length of the TB may be the number of feedback bits of the TB as configured by a high-layer parameter.

As an example, the predetermined value may be predetermined in the standard or configured by a high-layer parameter, e.g., the predetermined value may be 1 bit.

Exemplarily, it is assumed that the second feedback sequence includes first feedback information on at least one carrier. The maximum number of TBs corresponding to each HARQ process on the carrier is 2, and the maximum number of CBGs included in each TB is 4. Then, in an implementation, the length of the first feedback information may be determined based on 4. In another implementation, the length of the first feedback information may be determined based on 2. In yet another implementation, the length of the first feedback information is determined based on a predetermined value, which may be predetermined in the standard or configured by the network device via a high-layer parameter, e.g., via an RRC parameter.

For example, assuming that y SPS PDSCH transmissions are configured on the at least one carrier, the first feedback information includes feedback information corresponding to deactivation DCI (or deactivation command) for at least one of the y SPS PDSCH transmissions configured on the at least one carrier, the first feedback information may be determined based on a predetermined value, which may be e.g., 1 bit, or the deactivation command for the y configured SPS PDSCH transmissions corresponds to 1 bit; or assuming that the deactivation DCI for each SPS PDSCH corresponds to 1 bit of feedback information, and the at least one carrier includes y configurations, the length of the first feedback information is 1*y, i.e., y bits.

Optionally, if the second feedback sequence only includes feedback information corresponding to the deactivation DCI (or deactivation command) for at least one SPS PDSCH transmission configured on at least one of the N carriers, the length of the second feedback sequence may be 1 bit.

Optionally, the length of the second feedback sequence may be determined based on the number of SPS PDSCH transmissions configured in the N carriers.

For example, assuming that the feedback length corresponding to one SPS PDSCH configuration is 1 bit, and there are s SPS PDSCH configurations in the N carriers, then the length of the second feedback sequence may be determined based on s.

At step A2, the target feedback sequence is transmitted over a target time unit.

For the specific implementation of this step, reference may be made to step 202 in the above embodiment shown in FIG. 2, and details thereof will be omitted here.

It is to be noted that, the solution in the embodiment shown in FIG. 2 can also be applied to this embodiment. That is, in addition to the above described content, the embodiment may also include part or all of the content in the embodiment shown in FIG. 2.

In this embodiment of the present disclosure, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers. That is, the target feedback sequence may include the feedback information sorted based on HARQ process numbers, and the second feedback sequence corresponding to other cases. In this way, the flexibility of HARQ-ACK codebook feedback can be improved.

To facilitate understanding, the following examples will be given to briefly illustrate the specific implementations of the above HARQ-ACK codebook feedback method.

Example 1: The second feedback sequence includes feedback information corresponding to the first DCI for releasing a downlink SPS PDSCH.

In a possible implementation, when the terminal device needs to feed back the first feedback sequence sorted based on HARQ process numbers on time slot n, if the terminal device also needs to feed back the feedback information corresponding to the first DCI on time slot n, then the terminal device can generate the second feedback sequence, which includes the feedback information corresponding to the first DCI.

The terminal device may append the second feedback sequence after the first feedback sequence to obtain the target feedback sequence.

As an example, if a feedback mode including NDI feedback information is configured by the network device, the second feedback sequence may not include NDI information, or the second feedback sequence may include NDI information, which may be a predetermined value. For example, the NDI information may have a predetermined value of "0", or the NDI information may have a predetermined value of "1".

Optionally, if a CBG-based feedback mode is configured by the network device, if the carrier corresponding to the first DCI is configured with a CBG transmission mode, the length of the second feedback sequence may be determined based on the feedback length of a CBG, or the length of the second feedback sequence may be determined based on the feedback length of a TB, or the length of the second feedback sequence may be determined based on a predetermined value. Here, the feedback length of the CBG may be the number of feedback bits of CGBs corresponding to one TB as configured by a high-layer parameter, and the feedback length of the TB may be the number of feedback bits determined based on the maximum number of TBs as configured by a high-layer parameter.

The terminal device transmits a target feedback sequence via PUCCH1, and the target feedback sequence includes the first feedback sequence and the second feedback sequence.

In a possible implementation, when the terminal device is instructed to feedback, on time slot n, the first feedback sequence sorted based on the HARQ process numbers, if the terminal device is also instructed, on time slot n, to feedback the feedback information corresponding to the first DCI, the terminal device may not feedback, on time slot n, the feedback information corresponding to the first DCI. That is, when the terminal device is instructed to feedback, on time slot n, a Type-3 HARQ-ACK codebook and feedback information corresponding to SPS PDSCH release, the terminal device may consider that the priority of the Type-3 HARQ-ACK codebook is higher than that of the feedback information corresponding to the SPS PDSCH release, such that the terminal device only feeds back the Type-3 HARQ-ACK codebook on time slot n.

The terminal device transmits the target feedback sequence via PUCCH1, and the target feedback sequence includes the first feedback sequence.

Example 2: The second feedback sequence includes feedback information corresponding to an SPS PDSCH without DCI scheduling.

When the terminal device needs to feedback, on time slot n, the first feedback sequence sorted based on the HARQ process numbers, if the terminal device also needs to feedback, on time slot n, the feedback information corresponding to a downlink SPS PDSCH without DCI scheduling, then the terminal device can generate the second feedback sequence, which includes the feedback information corresponding to the downlink SPS PDSCH without DCI scheduling.

The terminal device may append the second feedback sequence after the first feedback sequence to obtain the target feedback sequence.

Further, if a feedback mode including NDI information is configured by the network device, the second feedback sequence also includes NDI information, which may be a predetermined value. The NDI information may have a predetermined value of "0", or the NDI information may have a predetermined value of "1". Alternatively, the second feedback sequence may not include NDI information.

For the network device, if it detects that the target feedback sequence includes the second feedback sequence, it can determine that the PDSCH corresponding to the downlink SPS PDSCH is a new transmission. As an example, the network device may not need to read the NDI information fed back by the terminal device.

If the carrier corresponding to the downlink SPS PDSCH without DCI scheduling is configured with the CBG feedback mode, the feedback information in the second feedback sequence may be fed back based on CBG. That is, the feedback length of the second feedback sequence may be based on the feedback length of the CBG. Alternatively, the feedback information in the second feedback sequence may be fed back based on TB. That is, the feedback length of the second feedback sequence may be determined based on the feedback length of the TB. The feedback length of the CBG may be the number of feedback bits of CBGs corresponding to one TB as configured by a high-layer parameter, and the feedback length of the TB may be the number of feedback bits determined based on the maximum number of TBs as configured by a high-layer parameter.

The terminal device transmits the target feedback sequence via PUCCH1, and the target feedback sequence includes the first feedback sequence and the second feedback sequence.

Example 3: If the first carrier is configured with a CBG-based transmission mode, and a CBG-based feedback mode is configured by the network device, the method according to the present disclosure may include the following steps.

When the terminal device needs to feedback, on time slot n, the first feedback sequence sorted based on the HARQ process numbers, and the first feedback sequence includes the feedback information sorted based on the HARQ process numbers on a first carrier, if the terminal device is scheduled on the first carrier, the length of the feedback information corresponding to each of at least one HARQ process on the first carrier as included in the first feedback sequence may be determined based on the feedback length of the CBG. If the terminal device does not receive scheduling on the carrier, the length of the feedback information corresponding to each of at least one HARQ process on the first carrier as included in the first feedback sequence may be determined based on the feedback length of the TB.

The terminal device transmits the target feedback sequence via PUCCH1, and the target feedback sequence includes the first feedback sequence.

Example 4: It is assumed that the terminal device is configured with two carriers, CC1 and CC2, respectively, with Carrier 1 configured with a CBG-based transmission mode. It is assumed that the terminal device is configured with one shot HARQ-ACK codebook feedback and configured with a CBG-based feedback mode.

Figure 3:
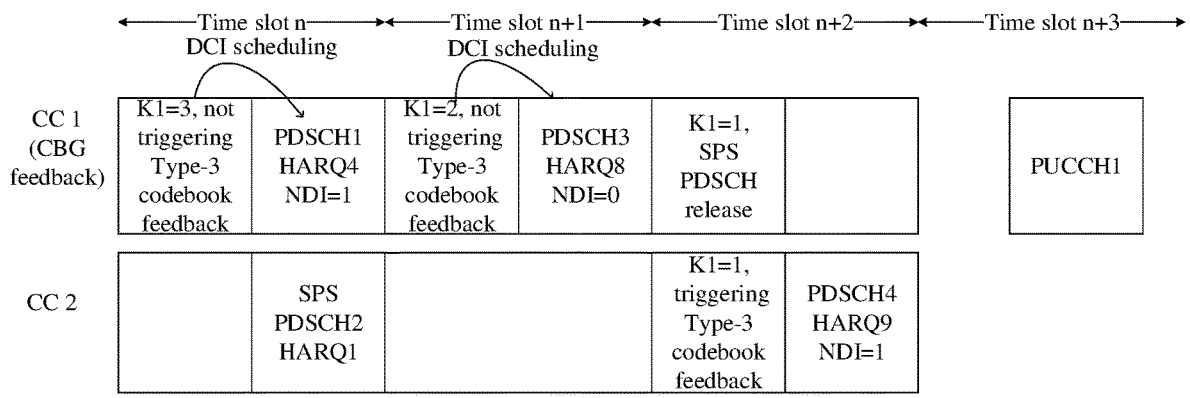
FIG. 3 is a schematic diagram showing data transmission according to an exemplary embodiment of the present disclosure.

Referring to FIG. 3, on Carrier 1, the terminal device receives scheduled PDSCH1 on time slot n, the corresponding HARQ process number is 4, and PDSCH1 includes 4 CBGs. The terminal device receives scheduled PDSCH3 on time slot n+1, the corresponding HARQ process number is 8, and PDSCH3 includes 2 CBGs. The terminal device receives first DCI for releasing SPS PDSCH scheduling on time slot n+2.

On Carrier 2, the terminal device receives, on time slot n, the SPS PDSCH without PDCCH scheduling, namely PDSCH2, and the corresponding HARQ process number is 1. The terminal device receives DCI-scheduled PDSCH4 on time slot n+2, and the corresponding HARQ process number is 9. The DCI on time slot n+2 also triggers one-shot HARQ feedback on time slot n+3.

In this way, the terminal device generates the target feedback sequence, which includes the first feedback sequence and the second feedback sequence. The first feedback sequence includes feedback information sorted based on HARQ process numbers on Carrier 1 and Carrier 2, and the second feedback sequence includes feedback information corresponding to the first DCI on Carrier 1.

It is assumed that the number of HARQ processes on each carrier is 16, the maximum number of TBs included in each HARQ process is 1, and the number of CBG feedback bits corresponding to each TB on Carrier 1 is 4. The feedback information corresponding to the unscheduled HARQ process is NACK, and/or the NDI information corresponding to the unscheduled HARQ process is 0. It can be appreciated that the feedback information corresponding to the unscheduled CBG should also be NACK.

As an example, the codebook of the target feedback sequence may be shown in FIG. 4, where the first feedback sequence includes feedback information corresponding to all HARQ processes on two carriers. Here, the feedback information corresponding to the PDSCH scheduled on Carrier 1 uses the CBG-based transmission mode for feedback, and the second feedback sequence includes 1-bit feedback information corresponding to the first DCI on Carrier 1.

As an example, if feedback including NDI information is configured by the network device, the first feedback sequence further includes NDI information corresponding to each TB of each of the HARQ processes. The codebook of the target feedback sequence may be shown in FIG. 5.

The terminal device feeds back the target feedback sequence via PUCCH1.

In some embodiments, an embodiment of the present disclosure further provides the following HARQ-ACK codebook feedback method, which may include the following implementation steps.

At step B1, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers, where N is a positive integer.

As an example, the first feedback sequence may include N first feedback subsequences, each including feedback information corresponding to a HARQ process on the first carrier.

As an example, there may be one or more first carriers, and the embodiment of the present disclosure is not limited to this. As an example, the feedback information in the first feedback subsequence may be sorted in an ascending order of the HARQ process numbers.

As an example, if a feedback mode including NDI information is configured by the network device, the first feedback subsequence may further include NDI information corresponding to each TB of each HARQ process. As an example, if the HARQ process is used to transmit a semi-persistently scheduled physical channel, the value of the NDI information corresponding to the HARQ process may be a predetermined value (e.g., a predetermined value of 0).

As an example, if the first carrier is not configured with a CBG-based transmission mode, and/or a CBG-based feedback mode is not configured by the network device, the length of the feedback information corresponding to each of at least one HARQ process on the first carrier as included in the first feedback subsequence may be determined based on the feedback length of a TB. For example, the feedback length of the TB may be determined based on a parameter of the maximum number of TBs configured by the network device for the carrier.

As an example, if the first carrier is configured with a CBG-based transmission mode, and a CBG-based feedback mode is configured by the network device, the length of the feedback information corresponding to each of at least one HARQ process on the first carrier as included in the first feedback subsequence may be determined based on the feedback length of a CBG.

As an example, if a feedback mode including NDI information is configured by the network device, the first feedback subsequence may further include NDI information.

As an example, if a CBG-based feedback mode is configured by the network device, and a first carrier is configured with a CBG-based transmission mode, and if the terminal device receives scheduling on the first carrier, the first feedback subsequence may include CBG-based feedback information corresponding to at least one HARQ process on the first carrier, or otherwise the first feedback subsequence may include TB-based feedback information corresponding to at least one HARQ process on the first carrier.

As an example, the second feedback sequence may include P second feedback subsequences, each including feedback information on each of P out of the N carriers, where P is a positive integer smaller than or equal to N.

As an example, the second feedback sequence may include P second feedback subsequences, and the second feedback subsequence may include feedback information on a second carrier. As an example, the second feedback subsequence may include feedback information corresponding to fourth DCI, which is DCI on the second carrier for releasing an SPS PDSCH, or DCI for releasing an SPS PDSCH on the second carrier.

As an example, the feedback information included in the second feedback subsequence may be feedback information corresponding to a semi-persistently scheduled PDSCH on a third carrier.

As an example, if a feedback mode including NDI information is configured by the network device, the second feedback subsequence may not include NDI information. Alternatively, the second feedback subsequence may include NDI information, which is a predetermined value (e.g., a predetermined value of 0).

Optionally, if the second carrier is configured with a CBG-based transmission mode, and the second feedback subsequence includes feedback information corresponding to a second carrier, then the length of the feedback information corresponding to the second carrier may be determined based on the feedback length of a CBG. Alternatively, the length of the feedback information corresponding to the two target carriers may be determined based on the feedback length of a TB. Alternatively, the length of the feedback information corresponding to the second carrier may be determined based on a predetermined value.

As an example, the feedback length of the CBG may be the number of feedback bits of CBGs corresponding to one TB as configured by a high-layer parameter.

As an example, the feedback length of the TB may be the number of feedback bits determined based on the maximum number of TBs as configured by a high-layer parameter.

As an example, the predetermined value may be predetermined in the standard or configured by a high-layer parameter. For example, the predetermined value may be 1 bit.

As an example, the target feedback sequence includes the first feedback sequence and the second feedback sequence, and the j-th second feedback subsequence of the P second feedback subsequences is located after the i-th first feedback subsequence of the N first feedback subsequences. Here, the j-th second feedback subsequence and the i-th first feedback subsequence correspond to the same one of the N carriers.

As an example, the second feedback sequence may further include second indication information, which is used to determine the length of the second feedback subsequence. Exemplarily, the target feedback sequence may include {first feedback subsequence 1, second feedback subsequence 1, first feedback subsequence 2}, or {first feedback subsequence 1, second indication information, second feedback subsequence 1, first feedback subsequence 2}

At step B2, the target feedback sequence is transmitted over a target time unit.

For specific implementation, reference can be made to the above embodiments.

Continuing with the above Example 4 above, the target feedback sequence may include a first feedback subsequence 1 and a first feedback subsequence 2. Here the first feedback subsequence 1 includes all feedback information sorted based on HARQ process numbers on Carrier 1, the first feedback subsequence 2 includes feedback information corresponding to all HARQ processes on Carrier 2, and the second feedback sequence includes a second feedback subsequence 1. Here, the second feedback subsequence 1 includes 1-bit feedback information corresponding to first DCI on Carrier 1. The codebook of the target feedback sequence can be shown in FIG. 6.

As another example, if feedback including NDI information is configured by the network device, the first feedback sequence may further include NDI information corresponding to each TB of each HARQ process, and the codebook of the target feedback sequence can be shown in FIG. 7.

In this embodiment of the present disclosure, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers. That is, the target feedback sequence may include the feedback information sorted based on HARQ process numbers, and the second feedback sequence corresponding to other cases. In this way, the flexibility of HARQ-ACK codebook feedback can be improved.

It is to be noted that, the predetermined values as described above may be the same or different, and the embodiment of the present disclosure is not limited to this.

Referring to FIG. 8, which is a schematic diagram showing a structure of a HARQ-ACK codebook feedback apparatus according to an exemplary embodiment, the apparatus may include:

a determination module 810 configured to determine a target feedback sequence, the target feedback sequence including at least one of a first feedback sequence and a second feedback sequence, the first feedback sequence including feedback information sorted based on HARQ process numbers on N carriers, and the second feedback sequence including feedback information on at least one of the N carriers, where N is a positive integer; and a transmitting module 820 configured to transmit the target feedback sequence over a target time unit.

Optionally, the feedback information included in the second feedback sequence may not sorted based on the HARQ process numbers; the feedback information included in the second feedback sequence may not correspond to a valid HARQ process number; or the feedback information included in the second feedback sequence may not correspond to any HARQ process number. Optionally, the second feedback sequence may include at least one of: feedback information corresponding to first Downlink Control Information (DCI), the first DCI being DCI indicating release of a Semi-Persistent Scheduling (SPS) Physical Downlink Shared Channel (PDSCH); feedback information corresponding to second DCI, or feedback information corresponding to an SPS PDSCH scheduled by the second DCI, the second DCI being DCI indicating activation of the SPS PDSCH; feedback information corresponding to a physical channel scheduled by third DCI, the third DCI not including any HARQ process number, or the third DCI not including any valid HARQ process number; and feedback information corresponding to an SPS PDSCH without DCI scheduling as transmitted on the at least one carrier.

Optionally, when a feedback mode including New Data Indication (NDI) information is configured by a network device, the second feedback sequence may further include NDI information, which is a predetermined value; or the second feedback sequence may not include NDI information.

Optionally, when a Code Block Group (CBG) based feedback mode is configured by a network device, the second feedback sequence may include first feedback information on the at least one carrier, the first feedback information having a length that is determined based on at least one of: a feedback length of a CBG; a feedback length of a Transmission Block (TB); or a predetermined value.

Optionally, when at least one of the N carriers has an SPS PDSCH transmission configured thereon, the target feedback sequence may include the first feedback sequence and the second feedback sequence, and the second feedback sequence may include feedback information on the at least one carrier on which the SPS PDSCH transmission is configured; or when none of the N carriers has an SPS PDSCH transmission configured thereon, the target feedback sequence may include the first feedback sequence.

Optionally, when a feedback mode including NDI information is configured by a network device and the first feedback sequence includes second feedback information corresponding to a first HARQ process for transmitting an SPS PDSCH, the second feedback information may include first NDI information, which is a predetermined value.

Optionally, when a Code Block Group (CBG) based feedback mode is configured by a network device, and M out of the N carriers are configured with a CBG-based transmission mode: the feedback information corresponding to each of at least one HARQ process on the M carriers as included in the first feedback sequence may have a length determined based on a feedback length of a CBG, and the feedback information corresponding to each of at least one HARQ process on K carriers as included in the first feedback sequence may have a length determined based on a feedback length of a TB, the K carriers may include other carriers than the M carriers among the N carriers, where M and K are both integers smaller than or equal to N.

Optionally, when a Code Block Group (CBG) based feedback mode is configured by a network device, and a target carrier among the N carriers is configured with a CBG-based transmission mode: when scheduling is received on the target carrier, the feedback information corresponding to each of at least one HARQ process on the target carrier as included in the first feedback sequence may have a length determined based on a feedback length of a CBG; and/or when no scheduling is received on the target carrier, the feedback information corresponding to each of the at least one HARQ process on the target carrier as included in the first feedback sequence may have a length determined based on a feedback length of a TB.

Optionally, the scheduling received on the target carrier may include at least one of: a scheduled PDSCH transmission; a PDCCH transmission for activating a downlink SPS PDSCH; a PDCCH transmission for releasing a downlink SPS PDSCH; and a downlink SPS PDSCH transmission without corresponding PDCCH scheduling.

Optionally, the target feedback sequence may have a length that is determined based on a length of the first feedback sequence and/or a length of the second feedback sequence.

Optionally, when at least one of the N carriers has an SPS PDSCH transmission configured thereon, the length of the target feedback sequence may be determined based on the length of the first feedback sequence and the length of the second feedback sequence; or when none of the N carriers has an SPS PDSCH transmission configured thereon, the length of the target feedback sequence may be determined based on the length of the first feedback sequence.

Optionally, the length of the second feedback sequence may be determined based on a number of SPS PDSCH transmissions configured in the N carriers; or the length of the second feedback sequence may be 1 bit.

Optionally, the target feedback sequence may include first indication information, the first indication information may be used to determine a total number of information bits included in the first feedback sequence; the first indication information may be used to determine a total number of information bits included in the second feedback sequence; or the first indication information may be used to determine a total number of information bits included in the first feedback sequence and the second feedback sequence.

Optionally, the N carriers may be all carriers included in one Physical Uplink Control Channel (PUCCH) group; or the N carriers may be activated carriers among all carriers included in one PUCCH group.

Optionally, the first feedback sequence may include feedback information of all HARQ processes on the N carriers, sorted based on HARQ process numbers, and the order of the first feedback sequence may be based on HARQ process numbers first and then carriers.

Optionally, the target feedback sequence may include the first feedback sequence and the second feedback sequence, and the target time unit may include a first uplink resource, and the operation of transmitting the target feedback sequence over the target time unit may include: transmitting the target feedback sequence on the first uplink resource. In the target feedback sequence, the first feedback sequence may be located before the second feedback sequence.

Optionally, the target feedback sequence may include the first feedback sequence and the second feedback sequence, the target time unit may include a first uplink resource and a second uplink resource, and the operation of transmitting the target feedback sequence over the target time unit may include: transmitting the first feedback sequence on the first uplink resource, and/or transmitting the second feedback sequence on the second uplink resource.

In the embodiment of the present disclosure, a target feedback sequence is determined. The target feedback sequence includes at least one of a first feedback sequence and a second feedback sequence. The first feedback sequence includes feedback information sorted based on HARQ process numbers on N carriers, and the second feedback sequence includes feedback information on at least one of the N carriers. That is, the target feedback sequence may include the feedback information sorted based on HARQ process numbers, and the second feedback sequence corresponding to other cases. In this way, the flexibility of HARQ-ACK codebook feedback can be improved.

Figure 9:
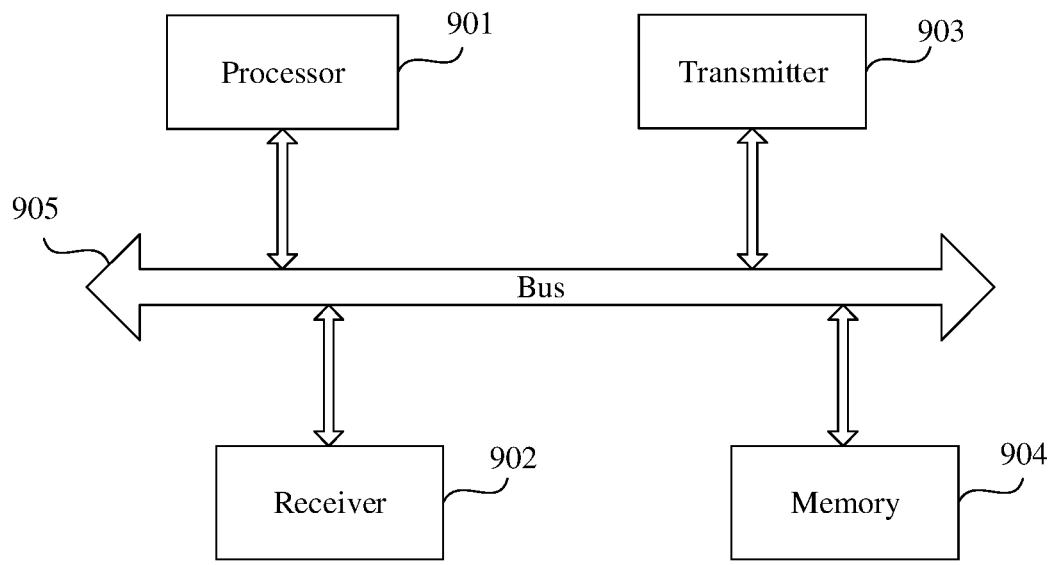
FIG. 9 is a schematic diagram showing a structure of a device according to another exemplary embodiment of the present disclosure.

FIG. 9 is a schematic diagram showing a structure of a device according to an exemplary embodiment of the present disclosure. The device can be a terminal device or a network device. The device includes: a processor 901, a receiver 902, a transmitter 903, a memory 904, and a bus 905.

The processor 901 includes one or more processing cores, and the processor 901 is configured to perform various functional applications and information processing by executing software programs and modules. The receiver 902 and the transmitter 903 may be implemented as a communication component, which may be a communication chip. The memory 904 is connected to the processor 901 via the bus 905. The memory 904 may be configured to store at least one instruction, and the processor 901 is configured to execute the at least one instruction, so as to implement the method in any of the above method embodiments.

In addition, the memory 904 may be implemented by any type of volatile or non-volatile storage device or any combination thereof. The volatile or non-volatile storage devices include but are not limited to: magnetic disk or optical disc, Electrically Erasable Programmable Read-Only Memory (EEPROM), Erasable Programmable Read-Only Memory (EPROM), Static Random-Access Memory (SRAM), Read-Only Memory (ROM), magnetic memory, flash memory, Programmable Read-Only Memory (PROM), etc.

The present disclosure provides a computer-readable storage medium. The storage medium has at least one instruction stored therein. The at least one instruction can be loaded and executed by the processor to implement the method according to any of the above method embodiments.

The present disclosure also provides a computer program product, which, when executed on a computer, enables the computer to perform the method according to any of the above method embodiments.

It can be appreciated by those of ordinary skill in the art that all or part of the steps in the above embodiment can be implemented by hardware, or by a program instructing relevant hardware. The program can be stored in a computer-readable storage medium, which can be a read-only memory, a magnetic disk or an optical disc, etc.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A HARQ-ACK codebook feedback method, comprising:
   determining a target feedback sequence, wherein the target feedback sequence comprises at least one of a first feedback sequence and a second feedback sequence, the first feedback sequence comprises feedback information sorted based on HARQ process numbers on N carriers, and the second feedback sequence comprises feedback information on at least one of the N carriers, where N is a positive integer; and
   transmitting the target feedback sequence over a target time unit;
   wherein a Code Block Group (CBG) based feedback mode is configured, and M out of the N carriers are configured with a CBG-based transmission mode;
   wherein the feedback information corresponding to each of at least one HARQ process on the M carriers as comprised in the first feedback sequence has a length determined based on a feedback length of a CBG, and the feedback information corresponding to each of at least one HARQ process on K carriers as comprised in the first feedback sequence has a length determined based on a feedback length of a TB, wherein the K carriers comprise other carriers than the M carriers among the N carriers, where M and K are both integers smaller than or equal to N.

2. The method according to claim 1, wherein
   the feedback information comprised in the second feedback sequence is not sorted based on the HARQ process numbers;
   the feedback information comprised in the second feedback sequence does not correspond to a valid HARQ process number; or
   the feedback information comprised in the second feedback sequence does not correspond to any HARQ process number.

3. The method according to claim 1, wherein the second feedback sequence comprises at least one of:
   feedback information corresponding to first Downlink Control Information (DCI), wherein the first DCI is DCI indicating release of a Semi-Persistent Scheduling (SPS) Physical Downlink Shared Channel (PDSCH);
   feedback information corresponding to second DCI, or feedback information corresponding to an SPS PDSCH scheduled by the second DCI, wherein the second DCI is DCI indicating activation of the SPS PDSCH;
   feedback information corresponding to a physical channel scheduled by third DCI, wherein the third DCI does not comprise any HARQ process number, or the third DCI does not comprise any valid HARQ process number; and
   feedback information corresponding to an SPS PDSCH without DCI scheduling as transmitted on the at least one carrier.

4. The method according to claim 1, wherein
   when a feedback mode including New Data Indication (NDI) information is configured, the second feedback sequence further comprises NDI information, which is a predetermined value; or
   the second feedback sequence does not comprise NDI information.

5. The method according to claim 1, wherein when a Code Block Group (CBG) based feedback mode is configured, the second feedback sequence comprises first feedback information on the at least one carrier, the first feedback information having a length that is determined based on at least one of:
   a feedback length of a CBG;
   a feedback length of a Transmission Block (TB); or
   a predetermined value.

6. The method according to claim 1, wherein
   when at least one of the N carriers has an SPS PDSCH transmission configured thereon, the target feedback sequence comprises the first feedback sequence and the second feedback sequence, and the second feedback sequence comprises feedback information on the at least one carrier on which the SPS PDSCH transmission is configured; or
   when none of the N carriers has an SPS PDSCH transmission configured thereon, the target feedback sequence comprises the first feedback sequence.

7. The method according to claim 1, wherein when a feedback mode including NDI information is configured and the first feedback sequence comprises second feedback information corresponding to a first HARQ process for transmitting an SPS PDSCH, the second feedback information comprises first NDI information, which is a predetermined value.

8. The method according to claim 1, wherein when a Code Block Group (CBG) based feedback mode is configured, and a target carrier among the N carriers is configured with a CBG-based transmission mode:
   when scheduling is received on the target carrier, the feedback information corresponding to each of at least one HARQ process on the target carrier as comprised in the first feedback sequence has a length determined based on a feedback length of a CBG; and/or
   when no scheduling is received on the target carrier, the feedback information corresponding to each of the at least one HARQ process on the target carrier as comprised in the first feedback sequence has a length determined based on a feedback length of a TB.

9. The method according to claim 8, wherein the scheduling received on the target carrier comprises at least one of:
   a scheduled PDSCH transmission;
   a PDCCH transmission for activating a downlink SPS PDSCH;
   a PDCCH transmission for releasing a downlink SPS PDSCH; and
   a downlink SPS PDSCH transmission without corresponding PDCCH scheduling.

10. The method according to claim 1, wherein the target feedback sequence has a length that is determined based on a length of the first feedback sequence and/or a length of the second feedback sequence.

11. The method according to claim 10, wherein the length of the second feedback sequence is determined based on a number of SPS PDSCH transmissions configured in the N carriers; or
   the length of the second feedback sequence is 1 bit.

12. The method according to claim 10, wherein
   when at least one of the N carriers has an SPS PDSCH transmission configured thereon, the length of the target feedback sequence is determined based on the length of the first feedback sequence and the length of the second feedback sequence; or
   when none of the N carriers has an SPS PDSCH transmission configured thereon, the length of the target feedback sequence is determined based on the length of the first feedback sequence.

13. The method according to claim 1, wherein the target feedback sequence comprises first indication information,
   the first indication information is used to determine a total number of information bits comprised in the first feedback sequence;
   the first indication information is used to determine a total number of information bits comprised in the second feedback sequence; or
   the first indication information is used to determine a total number of information bits comprised in the first feedback sequence and the second feedback sequence.

14. The method according to claim 1, wherein
   the N carriers are all carriers comprised in one Physical Uplink Control Channel (PUCCH) group; or
   the N carriers are activated carriers among all carriers comprised in one PUCCH group.

15. The method according to claim 1, wherein the first feedback sequence comprises feedback information of all HARQ processes on the N carriers, sorted based on HARQ process numbers, and the order of the first feedback sequence is based on HARQ process numbers first and then carriers.

16. The method according to claim 1, wherein the target feedback sequence comprises the first feedback sequence and the second feedback sequence, and the target time unit comprises a first uplink resource, and said transmitting the target feedback sequence over the target time unit comprises:
   transmitting the target feedback sequence on the first uplink resource, wherein in the target feedback sequence, the first feedback sequence is located before the second feedback sequence.

17. The method according to claim 1, wherein the target feedback sequence comprises the first feedback sequence and the second feedback sequence, the target time unit comprises a first uplink resource and a second uplink resource, and said transmitting the target feedback sequence over the target time unit comprises:
   transmitting the first feedback sequence on the first uplink resource, and/or transmitting the second feedback sequence on the second uplink resource.

18. A device, comprising a processor and a memory, the memory having at least one instruction stored thereon, the at least one instruction, when executed by the processor, implementing a HARQ-ACK codebook feedback method, comprising:
   determining a target feedback sequence, wherein the target feedback sequence comprises at least one of a first feedback sequence and a second feedback sequence, the first feedback sequence comprises feedback information sorted based on HARQ process numbers on N carriers, and the second feedback sequence comprises feedback information on at least one of the N carriers, where N is a positive integer; and
   transmitting the target feedback sequence over a target time unit;
   wherein a Code Block Group (CBG) based feedback mode is configured, and M out of the N carriers are configured with a CBG-based transmission mode;
   wherein the feedback information corresponding to each of at least one HARQ process on the M carriers as comprised in the first feedback sequence has a length determined based on a feedback length of a CBG, and the feedback information corresponding to each of at least one HARQ process on K carriers as comprised in the first feedback sequence has a length determined based on a feedback length of a TB, wherein the K carriers comprise other carriers than the M carriers among the N carriers, where M and K are both integers smaller than or equal to N.

19. A non-transitory computer-readable storage medium, having at least one instruction stored thereon, the at least one instruction, when executed by a processor, implementing a HARQ-ACK codebook feedback method, comprising:
   determining a target feedback sequence, wherein the target feedback sequence comprises at least one of a first feedback sequence and a second feedback sequence, the first feedback sequence comprises feedback information sorted based on HARQ process numbers on N carriers, and the second feedback sequence comprises feedback information on at least one of the N carriers, where N is a positive integer; and
   transmitting the target feedback sequence over a target time unit;
   wherein a Code Block Group (CBG) based feedback mode is configured, and M out of the N carriers are configured with a CBG-based transmission mode;
   wherein the feedback information corresponding to each of at least one HARQ process on the M carriers as comprised in the first feedback sequence has a length determined based on a feedback length of a CBG, and the feedback information corresponding to each of at least one HARQ process on K carriers as comprised in the first feedback sequence has a length determined based on a feedback length of a TB, wherein the K carriers comprise other carriers than the M carriers among the N carriers, where M and K are both integers smaller than or equal to N.

* * * * *